United States Patent [19]

Morris

[11] Patent Number: 4,760,779

[45] Date of Patent: Aug. 2, 1988

[54] DISTRIBUTION MEANS

[75] Inventor: Christopher P. Morris, Carlton, United Kingdom

[73] Assignee: Hambro Machinery Limited, United Kingdom

[21] Appl. No.: 88,025

[22] Filed: Aug. 18, 1987

Related U.S. Application Data

[63] Continuation of Ser. No. 930,956, Nov. 12, 1986, abandoned, which is a continuation of Ser. No. 844,220, Mar. 21, 1986, abandoned, which is a continuation of Ser. No. 651,064, Sep. 13, 1984, abandoned.

[30] Foreign Application Priority Data

Sep. 16, 1983 [GB] United Kingdom ................ 8324888
Dec. 7, 1983 [GB] United Kingdom ................ 8332648

[51] Int. Cl.$^4$ ................................ A23B 4/04
[52] U.S. Cl. .......................... 99/475; 34/10; 34/57 R; 99/473; 99/483
[58] Field of Search ............... 99/467–473, 99/474–476, 516, 534, 517, 483, 485; 34/57 A, 10, 57 R, 57 C, 57 E; 435/15, 58; 131/300, 302, 306; 432/500

[56] References Cited

U.S. PATENT DOCUMENTS 3,691,644  9/1972  Schnitzer ........................... 34/57 A

OTHER PUBLICATIONS

Trocknungstechnik (by K. Kroll, 2nd Volume, Springer Verlag, 1978 (and English translation), pp. 237 and 238.

Primary Examiner—Timothy F. Simone
Attorney, Agent, or Firm—Jones, Askew & Lunsford

[57] ABSTRACT

Distribution means for a fluidized bed, comprises a perforated plate (50) having a plurality of apertures. The cross-sectional area of each aperture is in the range of $20\times10^{-6}$ sq. inches (approximately $130\times10^{-6}$ sq. cm) to $1000\times10^{-6}$ sq. inches (approximately $6450\times10^{-6}$ sq. cm), and the total area of the apertures is in the range of 1% to 4% of the total area of the plate. A fluidized bed-type conditioning apparatus for conditioning material such as tea and tobacco, comprises a conditioning zone disposed above the distribution means, and further comprises means for supplying gaseous medium to said zone through said distribution means.

18 Claims, 2 Drawing Sheets

DISTRIBUTION MEANS

This application is a continuation of application Ser. No. 930,956, filed Nov. 12, 1986, now abandoned, which is a continuation of application Ser. No. 844,220, filed Mar. 21, 1986, now abandoned, which is a continuation of application Ser. No. 651,064, filed Sept. 13, 1984, now abandoned.

This invention relates to distribution means, and more particularly concerns distribution means for use in fluidised bed-type conditioning apparatus for conditioning leaf vegetable material such as tea and tobacco.

It is known to dry leaf vegetable material by means of fluid bed drying apparatus, but hitherto it has been difficult to obtain an even and consistent dried product.

In our prior U.K. Pat. No. 2026668 there is described and claimed a conditioning apparatus for conditioning material such as tea and tobacco which comprises a conditioning chamber disposed above gas distribution means, means for supplying gaseous medium to the chamber through the gas distribution means, the gas distribution means including an apertured plate having a mesh arranged on the gaseous medium supply side thereof, and having a resistance to flow of gaseous medium which increases as the rate of flow through the distribution means increases.

The gaseous medium is usually air which is at the temperature and humidity needed to produce the desired conditioning; the conditioning may be, for example, drying or cooling.

An object of the present invention is to provide an improved distribution means for use in a conditioning apparatus.

According to one aspect of the present invention we provide a distribution means for a fluidised bed-type conditioning apparatus, which distribution means comprises a perforated plate, said perforated plate having a plurality of apertures, wherein the cross-sectional area of each aperture is in the range of $20 \times 10^{-6}$ sq. inches (approximately $130 \times 10^{-6}$ sq.cm) to $1000 \times 10^{-6}$ sq. inches (approximately $6450 \times 10^{-6}$ sq.cm), and the total area of the apertures is in the range of 1% to 4% of the total area of the plate.

The provision of distribution means having apertures of the cross-sectional area in the above range, and having a total area in the above range enables the distribution means to provide a resistance to flow of gaseous medium which increases as the rate of flow through the distribution means increases.

Preferably the cross-sectional area of each aperture is in the range of $80 \times 10^{-6}$ sq inches (approximately $520 \times 10^{-6}$ sq.cm) to $700 \times 10^{-6}$ sq. inches (approximately $4520 \times 10^{-6}$ sq.cm) more preferably the cross-sectional area is in the range $170 \times 10^{-6}$ sq.inches (approximately $1100 \times 10^{-6}$ sq.cm.) to $500 \times 10^{-6}$ sq. inches (approximately $3220 \times 10^{-6}$ sq.cm), and most preferably the cross-sectional area is $300 \times 10^{-6}$ sq. inches (approximately $1940 \times 10^{-6}$ sq.cm).

The total area of the apertures may be in the range of one and one half percent to two and three-quarters percent of the total area of the plate.

In one embodiment the total area of the apertures may be in the range of one and one half percent to two percent of the total area of the plate.

In another embodiment the total area of the apertures may be in the range of two percent to two and three-quarters percent, more preferably two and one quarter percent to two and threequarters percent of the total area of the plate. The most preferable range for the total area of the apertures is between two and one quarter percent to 2.6 percent of the total area of the plate. The plate may advantageously be provided with a total area of apertures which is two and one half percent of the total area of the plate.

The distribution means is preferably such as to provide a pressure drop across the bed of 1 inch to 12 inches (approximately 2.5 cm to 30 cm) water gauge, more preferably 1 inch to 8 inches (approximately 2.5 cm to 20 cm) water gauge, and most preferably 2 inch to 4 inches (approximately 5 cm to 10 cm) water gauge.

The apertures may conveniently have a circular cross-sectional shape and are desirably evenly spaced.

When the apertures have a circular cross-section the diameter of each aperture is preferably in the range 5 thou ($12.7 \times 10^{-3}$cm) to 35 thou ($89 \times 10^{-3}$ cm), more preferably in the range 10 thou ($25.4 \times 10^{-3}$ cm) to 30 thou ($77 \times 10^{-3}$ cm), more preferably in the range 15 thou ($38 \times 10^{-3}$ cm) to 25 thou ($62.5 \times 10^{-3}$ cm), and most preferably 20 thou ($51 \times 10^{-3}$ cm).

The plate is preferably made of metal, when its thickness may be in the range 5 to 30 thou ($12.7 \times 10^{-3}$ cm to $77 \times 10^{-3}$ cm), preferably 10 to 20 thou ($25.4 \times 10^{-3}$ cm to $51 \times 10^{-3}$ cm). More preferably the plate is stainless steel.

Alternatively the plate may be a plastics material preferably a thermoset plastics material.

The plate may be planar, or non-planar such as concave of convex.

According to another aspect of the invention there is provided a fluidised bed-type conditioning apparatus for conditioning material such as tea and tobacco, comprising a conditioning zone disposed above distribution means as described above, and means for supplying gaseous medium to said zone through said distribution means.

Advantageously said conditioning apparatus is provided with support means for supporting said distribution means.

The support means may comprise a frame or a grid, advantageously an apertured plate, and may be disposed immediately above or below the distribution means. If the support means is an apertured plate then it is desirable that the apertures of the support means are of larger cross-sectional area than the apertures of the distribution means.

According to a further aspect of the present invention we provide a distribution means for a fluidised bed which distribution means comprises upper and lower perforated plates, the upper perforated plate having relatively large apertures and the lower perforated plate having relatively small apertures, the sizes of the apertures being such as to provide a resistance to flow of gaseous medium which increases as the rate of flow through the distribution means increases. To this end the apertures are provided with cross-sectional areas and with total areas as described above.

Reference is now made to the accompanying drawings in which.

Figure 1:
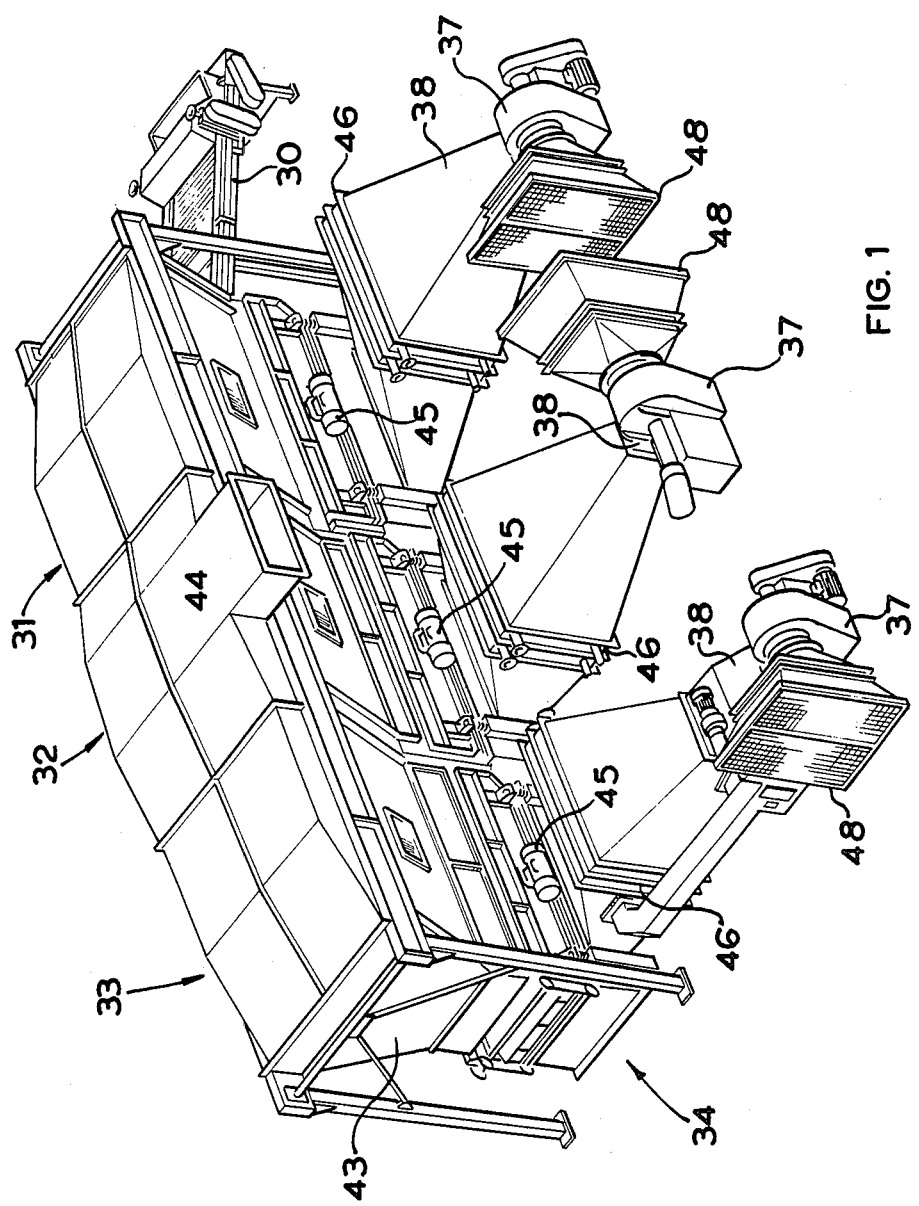
FIG. 1 is a perspective view of a conditioning apparatus for use with distribution means according to the present invention.

In the drawings, a tobacco conditioning plant comprises a feed conveyor 30 for tobacco leaf material to be conditioned, three conditioning apparatus 31, 32 and 33, and a discharge position 34 for leaf material which has been been conditioned. A conditioning gaseous medium, preferably air, is supplied to each apparatus by means of an individual filter 48 and a fan 37 which forces the air along ducts 38 which incorporate heaters 46, towards plenum chambers 39 (see FIG. 2) in each conditioning apparatus.

The heaters 46 are steam heated heat-exchange elements, but, if desired, heat exchange elements heated by other means may be employed, for example, gas, oil, wood or electricity.

Each duct 38 may be provided with an inlet pipe having a valve (not shown) which can be used to add additives to the air flowing into the plenum chamber 39. One additive which is frequently used in conditioning apparatus is live steam; the live steam helps to increase the moisture content of the conditioning air.

Figure 2:
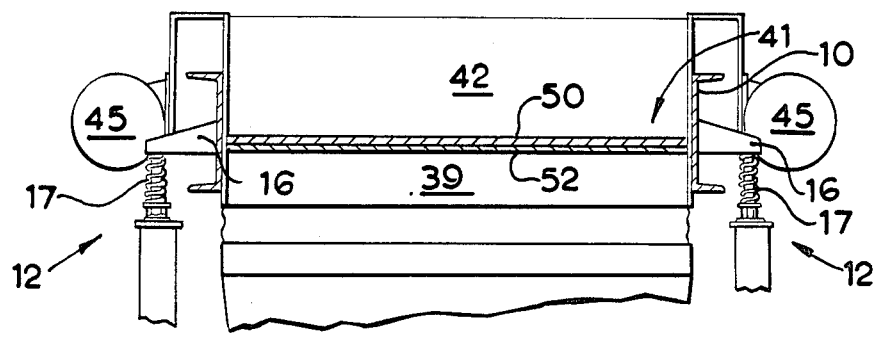
FIG. 2 is a schematic end elevation of part of the conditioning apparatus illustrated in FIG. 1, showing the distribution means according to the invention.
Figure 3:
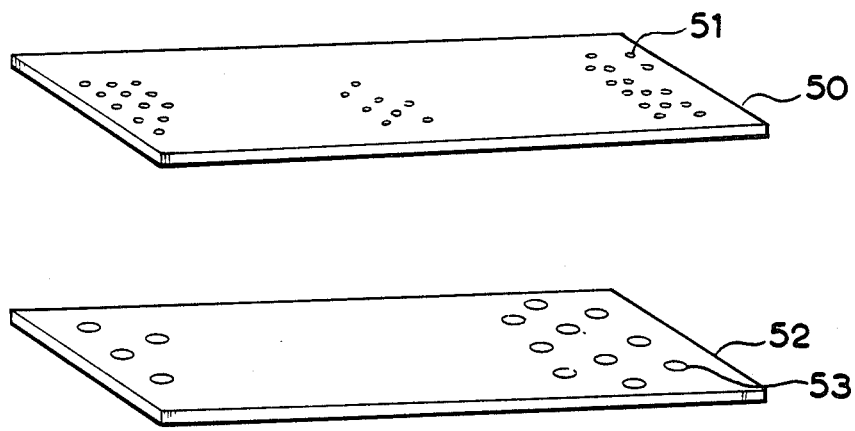
FIG. 3 is an perspective view of distribution means according to the invention.

The air passes through heaters 46 to each plenum chamber 39 and then through distribution means 50 into a fluidised conditioning zone 42 where it maintains the leaf material to be conditioned in a fluidised state (see FIG. 2). The air which emerges from the conditioning zone 42 is confined by each housing 43, and is extracted by means of a common air extractor hood and duct 44. If desired the housing 43 of one or more of the conditioning apparatus may include one or more adjustable baffles (not shown) above the conditioning zone 42 in order to obtain a desired air flow pattern.

The distribution means 50 is disposed in a bed frame 10 which is supported by adjustable bed supporting means generally designated 12 arranged one at each corner of the frame 10.

One or more vibration motors may be used otoeffect vibration of the bed 41 to assist fluidisation of the tobacco being conditioned. In the embodiment shown in the drawings, two such vibration motors 45 are fixed to each bed, one on each side thereof.

It is preferred to arrange the vibrations to take place mainly in a vertical plane and these vibrations are permitted by a compression spring 17 provided on the bed supporting means 12.

It is believed that the vibration of the bed creates a "plenum" layer between the distribution plate and the fluidised tobacco and assists in providing an even flow of air through the fluidised tobacco.

In the embodiment shown, leaf material which is to be conditioned is fed by means of the feed conveyor 30 into the first conditioning apparatus 31 where it progresses along the bed by virtue of it being in a substantially fluidised state.

In this way the material progresses to the second apparatus 32 and to the third apparatus 33 from where it is discharged. If desired, distribution means having different characteristics can be used in each apparatus 31, 32 and 33.

The distribution means 50 comprises a perforated plate 50 which is provided with apertures 51. The apertures are sized and spaced so that they provide a resistance to flow of the gaseous medium which increases as the flow through the distribution means increases, and so that they provide an even gas flow over the area of the plate.

In one preferred embodiment the apertures can each have a cross-sectional area of $5 \times 10^{-4}$ square inches (approximately $32 \times 10^{-8} m^2$) with 49 apertures being provided per square inch (approximately 8 apertures per $cm^2$).

In another preferred embodiment the apertures each have a cross-sectional area of $3 \times 10^{-4}$ square inches (approximately $20 \times 10^{-8} m^2$) with 81 apertures being provided per square inch (approximately 13 apertures per $cm^2$).

The thickness of the perforated plate 50 may be about $10^{-2}$ inches (approximately $2.5 \times 10^{-4}$ m).

The apertures may be produced in the plate 50 by any convenient method, for example, by punching, by laser beam drilling, or by chemical milling such as photoetching.

The perforated plate 50 serves to distribute the air evenly in the chamber 39 and to this end it has flow characteristics which are such that the resistance to flow of air through the plate increases with the rate of flow. This property tends to avoid the production of "blow holes" in the fluidised bed since these generate a localised increase in flow rate and this is counteracted by the increasing resistance to flow. These flow characteristics can be obtained by the correct choice of the size of apertures for the plate, and by the correct choice of the percentage of the area occupied by the apertures in the plate.

Vibration of the bed as described above also assists in providing an even flow of air through the tobacco being conditioned.

In FIG. 2 support means in the form of a perforated plate 52 having relatively large apertures 53 is arranged below the plate 50 and serves to provide a support for the plate. Screw holes (not shown) may be provided both in plate 50 and in support means 52 in order to facilitate bolting them together.

In order to provide accurate control of the condition of the leaf material being conditioned at least one of the apparatus 31, 32, 33 can be provided with a conditioning medium temperature control system. Usually this will be provided on the final apparatus in the plant. This is described in greater detail in or prior U.K. Patent Application No. 8313368.

The use of the conditioning apparatus described above, with the distribution means of the present invention, has been found to provide very even drying of leaf material such as tea or tobacco. Consequently the use of the distribution means makes possible the production of a dry product of higher quality than is possible with conventional driers.

The present invention also provides distribution means which is easily removable, easily cleaned, does not contaminate the product and which has a long useful life.

It will be appreciated that whilst in the foregoing description the distribution means has been described in conditioning apparatus for drying tobacco it could also be used in conditioning apparatus for conditioning other materials, such as by drying or cooling, by providing a flow of gaseous medium at the appropriate temperature and humidity.

I claim:

1. In a conditioning apparatus utilizing a fluidized bed for conditioning material such as tea and tobacco or the like, and comprising a material conditioning zone disposed above a distribution means, and means for supplying a gaseous medium to said zone through said distribution means, the improved distribution means comprising:

a perforated plate, said perforated plate having a plurality of apertures, wherein the cross-sectional area of each aperture is in the range of $20\times10^{-6}$ square inches to $1000\times10^{-6}$ square inches, and the total area of the apertures is in the range of 1% to 4% of the total area of the perforated plate, the perforated plate thereby providing a resistance to flow of the gaseous medium through the plate which increases as the rate of flow through the distribution means increases.

so that the tendency to produce localized increases in flow rate through the fluidized bed is counteracted by the increasing resistance to flow through the perforated plate.

2. Distribution means according to claim 1 in which the cross-sectional area of each aperture is in the range of $80\times10^{-6}$ sq. inches to $700\times10^{-6}$ sq. inches.

3. Distribution means according to claim 1 in which the cross-sectional area of each aperture is in the range $170\times10^{-6}$ sq. inches to 500 to $10^{-6}$ sq. inches.

4. Distribution means according to claim 1 in which the cross-sectional area of each aperture is $300\times10^{-6}$ sq. inches.

5. Distribution means according to claim 1 in which the total area of the apertures is in the range of one and one half percent to two and threequarters percent of the total area of the plate.

6. Distribution means according to claim 1 in which the total area of the apertures is in the range of one and one half percent to two percent of the total area of the plate.

7. Distribution means according to claim 1 in which the total area of the apertures is in the range of two and one quarter percent to two and threequarters percent of the total area of the plate.

8. Distribution means according to claim 1 in which the total area of the apertures is in the range of two and one quarter percent to 2.6 percent of the total area of the plate.

9. Distribution means according to claim 1, in which the apertures have a circular cross-sectional shape.

10. Distribution means according to claim 9 in which the diameter of each aperture is in the range 0.005 inch to 0.035 inch.

11. Distribution means according to claim 9 in which the diameter of each aperture is in the range 0.010 inch to 0.030 inch.

12. Distribution means according to claim 9 in which the diameter of each aperture is in the range 0.015 inch to 0.025 inch.

13. Distribution means according to claim 9 in which the diameter of each aperture is 0.020 inch.

14. Distribution means according to claim 1 in which the plate can provide a pressure drop across a fluidised bed of between 1 inch and 12 inches water gauge.

15. Distribution means according to claim 1 in which the plate can provide a pressure drop across the fluidised bed of between 2 inches and 4 inches water gauge.

16. Conditioning apparatus according to claim 1 further comprising support means for supporting said distribution means.

17. Conditioning apparatus according to claim 16 in which the support means comprises an apertured plate, and is disposed immediately alongside the distribution means.

18. Conditioning apparatus according to claim 17 in which the apertures of the support means are of larger cross-sectional area than the apertures of the distribution means.

* * * * *